No. 877,168.  
PATENTED JAN. 21, 1908.  
R. Y. BRADSHAW.  
AUTOMATIC WEIGHING MACHINE.  
APPLICATION FILED FEB. 15, 1906.  
5 SHEETS—SHEET 1.

Witnesses:  
Inventor:  
Robert Y. Bradshaw

No. 877,168. PATENTED JAN. 21, 1908.
R. Y. BRADSHAW.
AUTOMATIC WEIGHING MACHINE.
APPLICATION FILED FEB. 15, 1906.

5 SHEETS—SHEET 2.

Witnesses:
Rudow Rummler
L. A. Smith

Inventor,
Robert Y. Bradshaw
by Rummler & Rummler
Attorneys.

No. 877,168. PATENTED JAN. 21, 1908.
R. Y. BRADSHAW.
AUTOMATIC WEIGHING MACHINE.
APPLICATION FILED FEB. 15, 1906.

5 SHEETS—SHEET 3.

Witnesses:

Inventor,
Robert Y. Bradshaw,
by Rummler & Rummler,
Attorneys.

No. 877,168.

PATENTED JAN. 21, 1908.

R. Y. BRADSHAW.
AUTOMATIC WEIGHING MACHINE.
APPLICATION FILED FEB. 15, 1906.

5 SHEETS—SHEET 4.

Witnesses:
Inventor,
Robert Y. Bradshaw,
by Rummler & Rummler,
Attorneys.

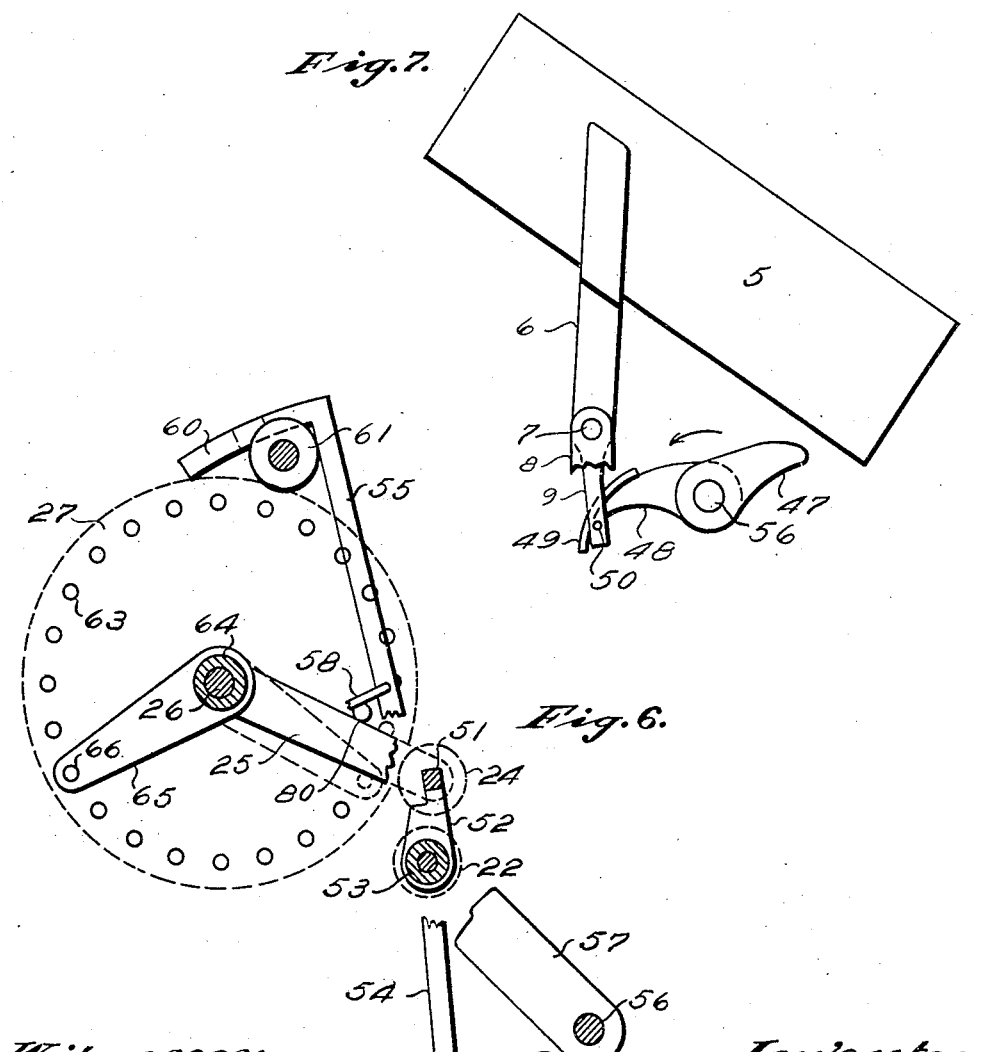

UNITED STATES PATENT OFFICE.

ROBERT Y. BRADSHAW, OF CHICAGO, ILLINOIS.

AUTOMATIC WEIGHING-MACHINE.

No. 877,168.　　　　　Specification of Letters Patent.　　　　Patented Jan. 21, 1908.

Application filed February 15, 1906. Serial No. 301,267.

*To all whom it may concern:*

Be it known that I, ROBERT Y. BRADSHAW, a citizen of the United States of America, and a resident of Chicago, Cook county, State of Illinois, have invented certain new and useful Improvements in Automatic Weighing-Machines, of which the following is a specification.

The main objects of this invention are to provide an automatic weighing machine, which may be adjusted for measuring uniform quantities of any desired weight of material and which will operate continuously and without requiring the constant attention of an operator for successively delivering accurately weighed quantities of material; to provide feeding mechanism for automatic weighing scales whereby the main portion of each charge of material will be approximately determined by a bulk measurement and then carefully brought to equal exactly the predetermined desired weight; to provide means for automatically stopping the feeding mechanism when an exact balance of the scale is reached, automatically discharging the contents of the scale-pan and automatically re-starting the feeding mechanism after the contents of the scale-pan have been discharged.

Other objects of this invention will appear from the following description.

Figure 1:
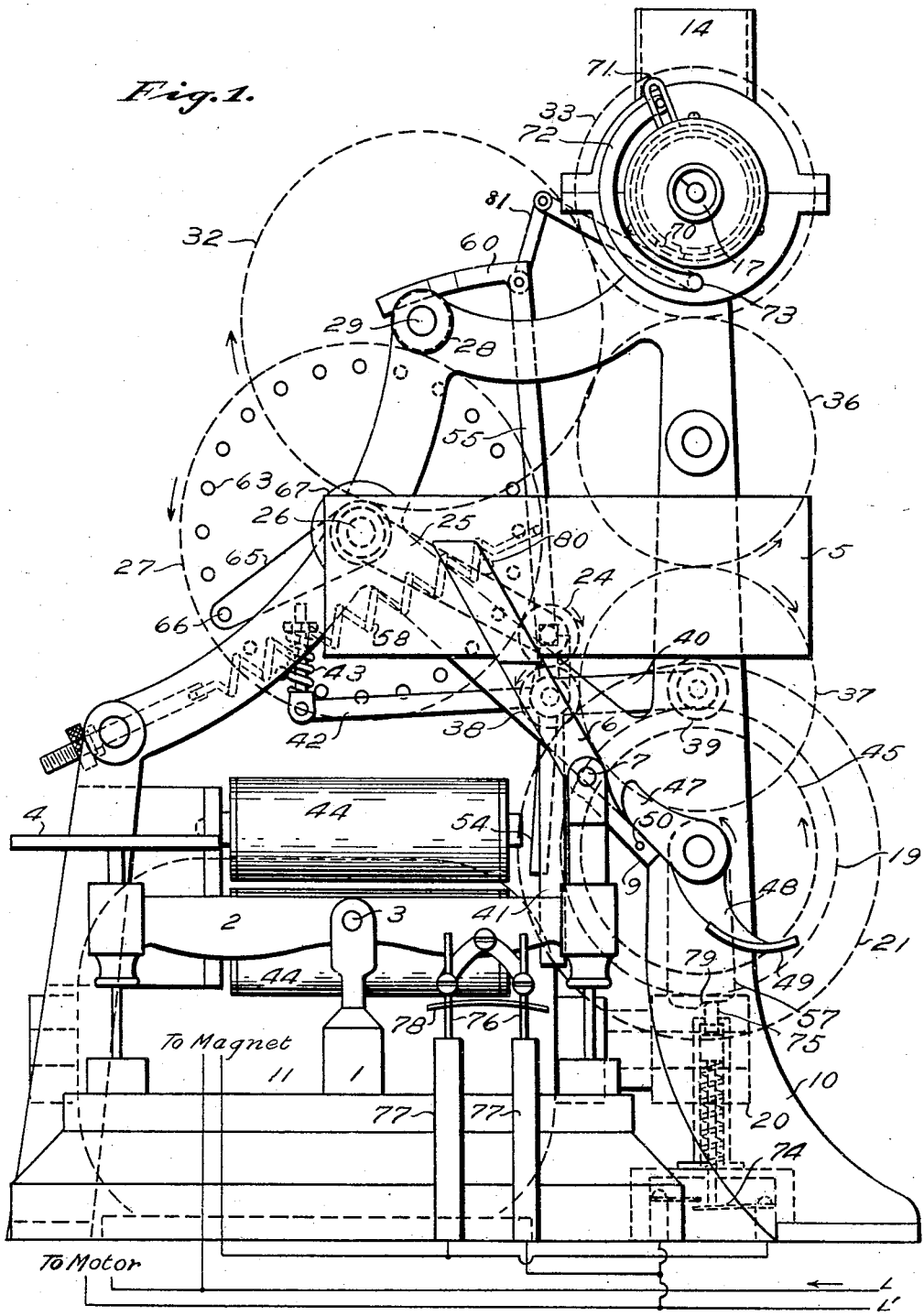
Figure 2:
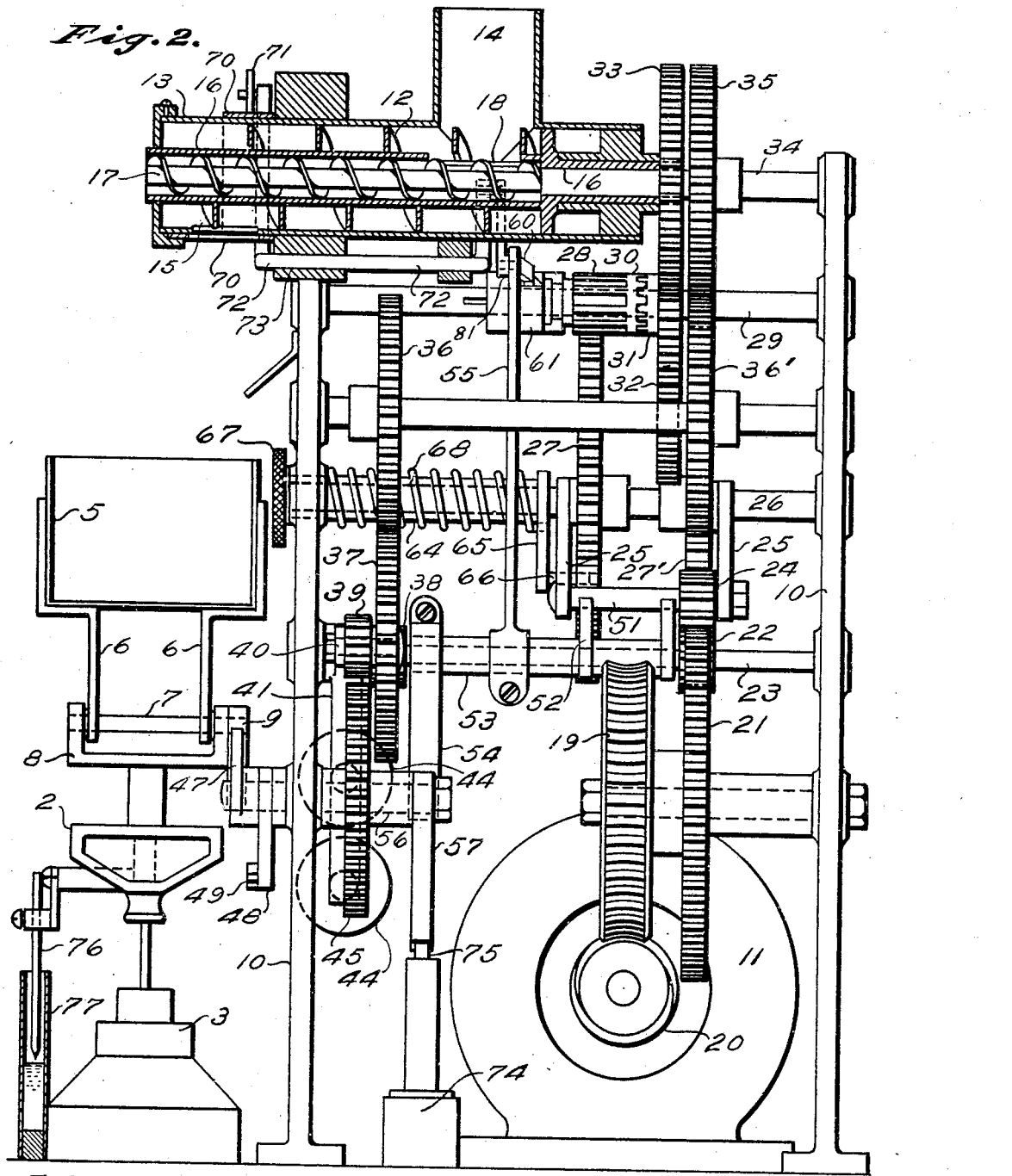
Figure 3:
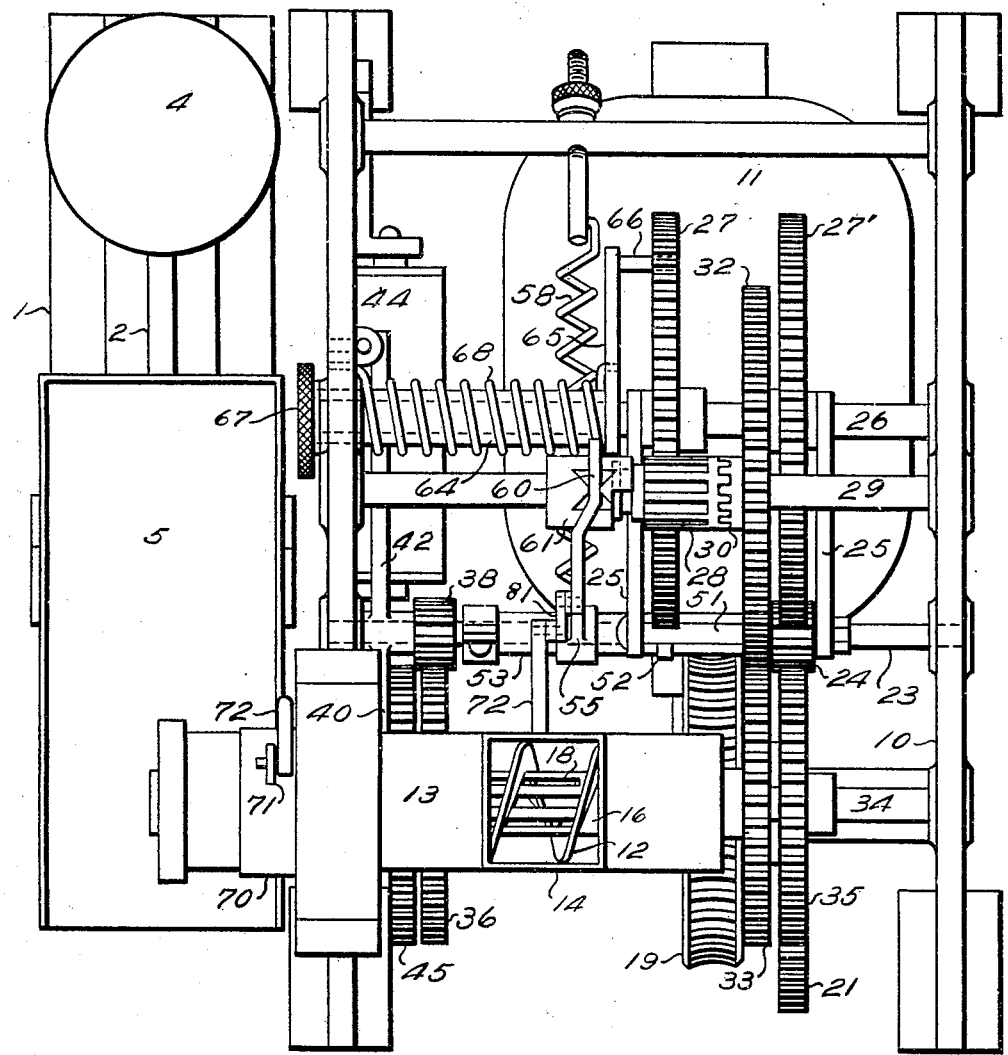
Figure 5:
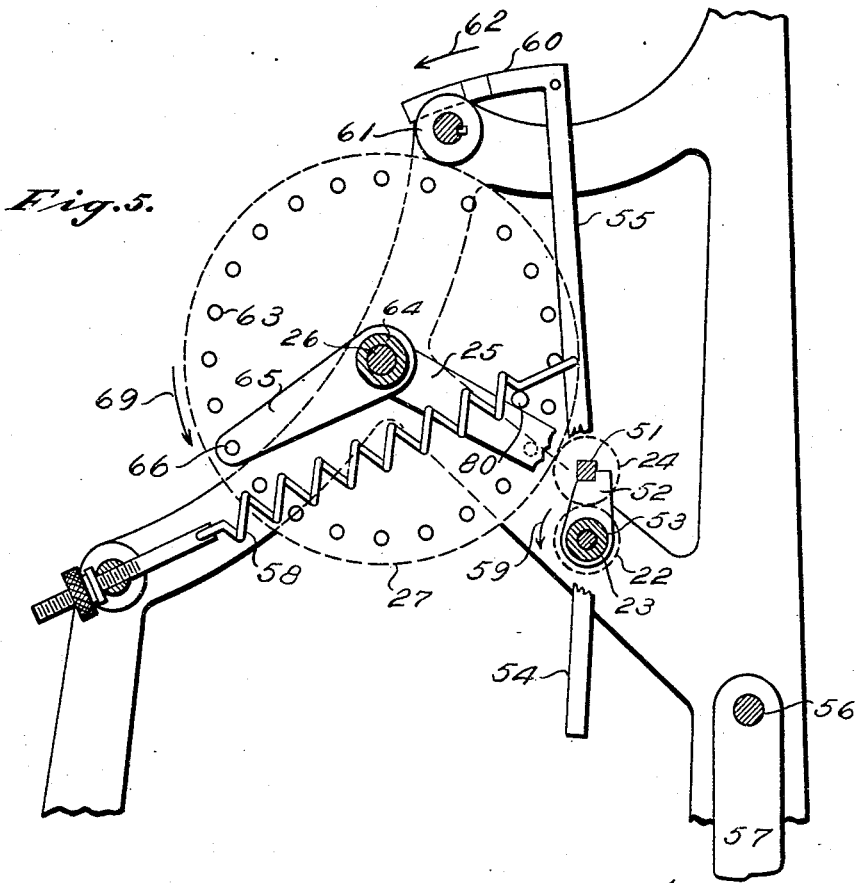
Figure 4:
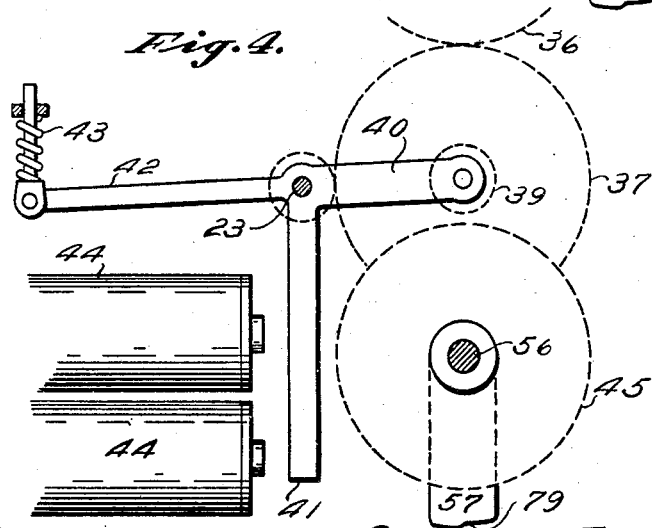

These objects are accomplished by the device shown in the accompanying drawings, in which:

Figure 1 is a front elevation of an automatic weighing machine constructed according to this invention, the electrical connections being indicated diagrammatically. Fig. 2 is an end elevation of the same, viewed from the right of Fig. 1, the force feed device being shown in section. Fig. 3 is a top plan of the same. Fig. 4 is a detail showing the arrangement of the magnet and armature which control the operations of the small conveyer and the dumping mechanism for the scale-pan. Fig. 5 is a detail, partly broken away, showing the mechanism which controls the operation of the large conveyer. Fig. 6 is a detail, also partly broken away, showing the same mechanism in the position for stopping the operation of said large conveyer. Fig. 7 is a detail showing the scale-pan in its tilted position.

In the construction shown in the drawings, the weighing mechanism consists of an ordinary balance scale 1 having a balance beam 2 fulcrumed at 3 and provided with a weight-pan 4 on one arm and a scale-pan 5 on the other. The scale pan 5 is supported by a pair of arms 6 which are rigidly mounted on a shaft 7 journaled in the yoke 8 on the balance beam. The shaft 7 also has an arm 9 which extends downwardly at one side of the yoke and serves to engage the mechanism for tilting the scale-pan to discharge its contents, as will be hereinafter described. At one side of the scale-pan is located the mechanism which feeds material into the scale pan and automatically stops the feed when the beam 2 is balanced and then automatically discharges the contents of the scale pan. This mechanism is adjustable to operate at any weight within the range of the scale 1. This mechanism is mounted in a supporting frame 10 and is driven by means of a motor 11. In the form shown, this mechanism comprises two conveyers arranged to feed material to the scale-pan. These conveyers are preferably in the form of spiral conveyers and are preferably arranged concentrically of each other as shown in Fig. 2. The larger conveyer 12 operates within a casing 13 and is adapted to convey granular or powdered material from the hopper 14 and discharge the same at the discharge opening 15 directly above the scale-pan 5. The shaft 16 of the conveyer 12 is hollow and forms a casing for the smaller conveyer 17. The smaller conveyer receives its supply of material through apertures 18 in the hollow shaft 16 at points below the hopper 14. The large conveyer 12 serves as a coarse feed for supplying the main bulk of material to the scale-pan, while the small conveyer 17 discharges a minute stream of material to the scale-pan and serves to permit of great accuracy in the feed. The conveyers 12 and 17 are each driven by a separate train of gears and their operations are separately controlled.

The conveyers are intermittently operated through automatic controlling devices. The mechanism controlling the large conveyer is arranged to stop it at the end of a certain predetermined number of revolutions thereof, while the small conveyer is stopped electrically by the balancing of the scale. The motor 11 is arranged to run continuously and drives the worm wheel 19 by means of the worm 20. The worm wheel 19 is rigidly connected with a spur gear 21 which meshes with a pinion 22 which is rigidly mounted on the shaft 23. This much of the gearing forms a part of the driving mechanism of each of the conveyers 12 and 17.

The conveyer 12 is driven by the train of gears which consists of the pinion 24, carried by arms 25 which are loosely journaled on the shaft 26, the twin gears 27 and 27', which are rigid on the shaft 26 and one of which meshes with the pinion 24, the pinion 28 which is loose on the shaft 29 and which meshes with the other of the twin gears 27, and the gears 32 and 33. The pinion 28 is provided with a clutch-face 30 which co-acts with a clutch-face 31 on the gear 32 which is loose on the shaft 29 and meshes with the gear 33 on the hollow shaft 16 of the conveyer 12.

The conveyer 17 is driven by the shaft 34 which extends through the hollow shaft 16 and is connected with the driving shaft 23 by the train of gears which consists of the gear 35, the twin gears 36 and 36', the gear 37, and the pinion 38. The gear 37 and a pinion 39 are rigidly connected together and are journaled in a bell-crank lever 40, which is loosely fulcrumed on the shaft 23 and has a depending arm 41 and a rearwardly extending arm 42. The bell-crank lever 40 is normally urged by the spring 43 so as to hold the gears 37 and 36 in mesh with each other. The members or gears 36 and 37 being movable into and out of mesh with each other are, in effect, a clutch which controls the operation of the light feed conveyer 17. The arm 41 of the bell-crank lever 40 forms the armature of a magnet 44 and when attracted by the magnet, throws the arm 40 downward, carrying the gear 37 out of mesh with the gear 36 and carrying the pinion 39 into mesh with the gear 45 which drives the cams 47 and 48 adapted to engage the arm 9 of the scale-pan and cause the scale-pan to rock on the shaft 7 for dumping its contents, the scale-pan being open at the end which is at the right in Fig. 1. The cam 48 has a lateral flange 49, the inner surface of which engages a transversely extending pin 50 on the arm 9 and serves to return the scale-pan to its normal upright position.

The arms 25 which carry the pinion 24 are loosely journaled on the shaft 26 and are connected together by means of a fixed shaft 51 upon which the pinion 24 is loosely journaled. The shaft 51 is square for the greater part of its length as seen in Fig. 5 and is supported by means of a pair of dogs 52 which are rigid on the sleeve 53. The sleeve 53 is loosely mounted on the shaft 23 and has a depending arm 54 and an upwardly extending arm 55 rigidly secured thereto. The shaft 56, which carries the gear 45 and the cams 47 and 48, also has rigidly mounted thereon a cam 57 which is adapted to engage the arm 54 when the shaft 56 is rotated and thereby swing the dogs 52 into position for engaging the shaft 51 as in Fig. 5 and permit the pinions 24 and 22 to mesh with each other. The spring 58 normally urges the dogs 52 to rotate in the direction of the arrow 59, in Fig. 5. The upper end of the arm 55 is bent as shown in Fig. 5, to form a cam 60. This cam extends through a groove in the periphery of the sleeve 61. This sleeve 61 is splined to the shaft 29. A portion of the sleeve 61 partly encircles the hub of the pinion 28 and has an inwardly extending shoulder seated in an annular groove in said hub. This arrangement permits the pinion to revolve freely in its connection with the sleeve 61, but causes the same to shift when the sleeve 61 is slid along the shaft 29. The cam 60 is so formed that, when swung in the direction of the arrow 62, it will separate the clutch members 30 and 31. As seen in Fig. 5, the arm 55 engages the sleeve 61 and limits the throw of the dogs 52 to a position for supporting the square shaft 51 on their high points. The cam 57 acting on the arm 54 moves the dogs 52 against the action of the spring 58 until the shaft 51 becomes seated in the notch at the end of the dogs 52.

The gear 27 is provided with an annular series of stop-apertures 63 in its face. The shaft 26 has loosely mounted thereon a sleeve 64 which carries an arm 65 having a pin 66 adapted to enter any one of the stop-apertures 63. The sleeve 64 extends through the bearing of the shaft 26 at the left of Fig. 2 and terminates in a knurled head 67 by means of which the arm 65 may be pulled out of engagement with the gear 27 and swung so as to bring the pin 66 into the desired stop-aperture 63. A spring 68 normally urges the arm 65 toward the face of the gear 27. One of the arms 25 which carry the pinion 24 is located between the arm 65 and the gear 27 so that, when said gear rotates in the direction of the arrow 69 in Fig. 5, the pin 66 will engage the arm 25 and lift the shaft 51, withdrawing the pinion 24 from mesh with the pinion 22 and permitting the spring 58 to swing the dogs so as to support the pinion 24 out of mesh.

The casing 13 of the conveyer 12 has a shutter 70 in the form of a sleeve around the casing 13 and provided with an aperture registering with the aperture 15 of the casing and adapted to close said aperture when the sleeve 70 is rotated. This rotation is accomplished by means of an arm 71 on the sleeve 70, a bell-crank lever 72 fulcrumed at 73 in the supporting frame, and a link 81 connecting the lever 72 with the arm 55. The bell-crank lever 72 is so arranged as to close the shutter 70 when the cam 60 opens the clutch which controls the operation of the conveyer 12.

The magnet 44 is controlled by means of an electric circuit indicated diagrammatically in Fig. 1. This circuit is a shunt of the line LL' from which the motor receives its power. The magnet circuit is controlled by two switches in shunt relation with each other. The switch 74 is normally closed but is adapted to be opened through the engagement of the cam 57 with the pin 75. The other switch consists of a pair of needle points 76 mounted on the balance beam 2, in electrical connection with each other and adapted to dip into mercury cups 77 and close one of the branch circuits of the magnet circuit when the balance beam is in a level position as shown in Fig. 1. The needle points are preferably provided with a guard plate 78 which forms a hood extending over the mercury cups and prevents powder or dust from falling upon the surface of the mercury therein. The needle points are adjustable on the beam.

The operation of the device shown is as follows: Assume that the motor 11 is continuously driven and that the hopper 14 is connected with a source of supply from which is fed the powdered or granular material which is to be weighed. Weights are placed upon the weight pan 4 to equal the weight of material which is to be measured at each operation of the machine. The weights upon the weight-pan 4 of the scale will normally hold the scale-pan in a lifted position when empty and will lift the needle points 76 out of the mercury cups. The second magnet circuit is also broken at the switch 74 since the cam 57 occupies the position shown in Fig. 1, when the scale-pan is empty as will hereinafter appear. All of the parts of the mechanism, except the scale, are shown in the positions which they occupy when the scale-pan 5 is empty. The parts of the scale are shown in the position which they occupy at the instant before the pan 5 is tipped for discharging its contents.

Assume now that the motor is continuously driven and since the clutches which control both of the conveyers are in their operative position, both conveyers will be running and each will be feeding material to the scale-pan. Assume also that the pin 66 has been set to such aperture in the gear 27 which will permit of sufficient rotation of said gear 27 to cause the large conveyer 12 to discharge a quantity of material approximating in bulk the quantity which is to be weighed at each operation of the machine, but being slightly less than the exact weight. This setting of the pin 66 is determined by experiment and depends upon the weight on the pan 4 and the density of the substance which is to be handled. When the gear 27 has revolved sufficiently to bring the pin 66 into contact with the arm 25, it will lift said arm and disconnect the pinions 24 and 22, stopping the large conveyer 12. The spring 58 then draws the dogs 53 into position for holding the pinions 24 and 22 apart, and the spring 68 causes the arm 65 to swing back to its normal position, as shown in Fig. 1, carrying with it the gear 27. This position is determined by the engagement of the stop 80 on the gear 27 with the arm 25. When the dogs 53 swing into position for holding apart the pinions 24 and 22, the cam 60 shifts the sleeve 61 and opens the clutch 30. This releases the gear 27 so that the same is free to return to the position shown in Fig. 1 without requiring a reverse rotation of the conveyer 12. After the stoppage of the conveyer 12, the conveyer 17 still continues to run, discharging a fine stream of material into the scale-pan. As soon as the material in the scale-pan has equaled the weight of the measuring weights on the weight pan 4, the magnet circuit will be closed by the needle points 76 and the armature 41 of the magnet will be attracted by the magnet, throwing the gears 37 and 36 out of mesh with each other and stopping the operation of the conveyer 17. This movement of the armature also throws the pinion 39 into mesh with the gear 45 and starts the rotation of the cam 47. This cam tips the scale-pan 5 and discharges its contents. The needle points 76 may be adjusted vertically to make exact allowance for the small amount of material which is in the air between the scale pan 5 and the mouth of the conveyer 17 at the instant of the stoppage. This adjustment causes the feed to stop at the exact instant necessary to bring the scale to a balance.

When the scale pan 5 is empty, the weights on the weight-pan 4 tip the balance beam and break the circuit at 76. This, however, does not release the armature from the magnet since the magnet circuit will still be closed by the shunt through the switch 74. When the gear 45 commences its rotation, at the time of dumping the scale pan, it carries the cam 57 out of engagement with the pin 75 and permits the switch 74 to close. Continued rotation of the gear 45 causes the cam arm 48 to return the scale-pan 5 to its upright position and at the same time carries the cam 57 into contact with the arm 54, returning the dogs 52 to the position shown in Fig. 5, permitting the pinions 24 and 22 to fall into mesh with each other and closing the clutch 30, thus again starting the large conveyer. The gear 45 continues to rotate until the cam 57 breaks the electric circuit at the switch 74. This releases the armature of the magnet and permits the spring 43 to throw the pinion 39 out of mesh with the gear 45. This stops the rotation of the gear 45 with the shoulder 79 of the cam 57 in contact with the pin 75. This shoulder is sufficient to prevent the cam from being carried too far by its momentum, but is beveled as shown in Fig. 4 so that the cam may be forced past the pin 57 when the pinion 39 is again brought into mesh with the gear 45 at the time of the next operation of the dumping mechanism.

When the armature 41 is released from the magnet 44, besides throwing the pinion 39 out of mesh with the gear 45, it throws the gear 37 into mesh with the gear 36 and starts the conveyer 17. It will thus be seen that both conveyers operate simultaneously until there has been deposited in the scale-pan a weight of material slightly less than the weight for which the machine is set. The large conveyer then ceases to operate and the small conveyer supplies the additional amount of material until it in turn is stopped by the closing of the magnet circuit when the scale-pan balances. The mechanism which stops the large conveyer is independent of the movement of the scale beam and therefore offers no resistance whatever to such movement. The electrical mechanism also offers no resistance to the movement of the beam since the electrical contact is made by needle points entering mercury cups and requires no pressure to insure perfect contact. By adjusting the needle points vertically, compensation may be made for the minute quantity of material which is falling between the feed devices and the scale pan at the instant that the contact takes place.

What I claim as my invention and desire to secure by Letters Patent is:

1. The combination of a scale having a balance beam, a scale-pan mounted thereon, feeding mechanism for supplying material to said scale-pan and comprising a coarse feed and a fine feed, an adjustable timing device independent of the scale beam and adapted to stop the coarse feed after it has operated for a predetermined interval of time, and means for automatically stopping the fine feed when the scale beam is in equilibrium.

2. The combination of a weighing scale, a conveyer adapted to feed material to said scale, means controlled independently of the scale for automatically stopping said conveyer when it has delivered a certain predetermined bulk of material to said scale, a second conveyer adapted to feed material to said scale at a slower rate than that of the first conveyer, and mechanism controlled by the scale for automatically stopping said second conveyer when said scale indicates a certain predetermined weight of material.

3. In a weighing scale, the combination of a scale-pan mounted to tilt for discharging its contents, mechanism for weighing the contents of said scale-pan, and means controlled by the weighing mechanism for automatically tipping said scale-pan to discharge its contents when a certain predetermined weight is indicated by said weighing mechanism.

4. In a weighing scale, the combination of a balance beam, a scale-pan pivotally mounted on one arm of said beam, a counterbalance on the other arm, and mechanism controlled by the movement of said balance beam and adapted to automatically tip said scale-pan for discharging its contents when the weight of such contents balances the counterweight, said mechanism being adapted to return said scale-pan to its normal upright position after the discharge of its contents.

5. The combination of a pair of spiral conveyers of different sizes each adapted to convey powdered or granular material, a motor provided with independent sets of driving mechanisms for operating said conveyers, a scale adapted to receive the material delivered by said conveyers, timing mechanism independent of said scale and adapted to automatically stop the larger conveyer after it has operated for a certain predetermined interval of time, and mechanism controlled by said scale for automatically stopping said smaller conveyer when a certain predetermined weight of material has been delivered to said scale.

6. The combination of two members movable into and out of engagement with each other for transmitting rotation from one to the other, a disk mounted to rotate and having therein an annular series of stop apertures, a stop pin fitting one of said apertures and being rotatable with said disk, a part disposed near said disk and extending across the path of said stop pin, said part being connected with one of the members and being adapted to shift such member relatively of the other member when engaged by said pin.

7. The combination of a frame, a spiral conveyer mounted in said frame, a disk geared to said conveyer and having therein an annular series of stop apertures, a stop pin adapted to be inserted into one of the apertures of said disk and being rotatable therewith, mechanism for operating said conveyer, and a part extending across the path of said pin and adapted through engagement with said pin to stop the conveyer.

8. The combination of a frame, a spiral conveyer mounted in said frame, a disk geared to said conveyer and having therein an annular series of stop apertures, a stop pin adapted to be inserted into one of the apertures of said disk and being rotatable therewith, mechanism for operating said conveyer, a part extending across the path of said pin and adapted through engagement with said pin to stop the conveyer, and means for automatically re-setting said disk to a certain initial position.

9. The combination of a frame having therein a spiral conveyer and a motor for operating said conveyer, a pair of separable co-acting members controlling the operation of said conveyer, a disk mounted to rotate in said frame and geared to said conveyer, said disk having a stop rotatable therewith and adjustable thereon angularly of the axis thereof, a part extending across the path of said stop and adapted when engaged thereby to separate said members and stop the conveyer, and means for automatically returning said disk to a certain initial position.

10. The combination of a frame having therein a spiral conveyer and a motor for operating said conveyer, a pair of separable coacting members controlling the operation of said conveyer, a disk mounted to rotate in said frame and geared to said conveyer, said disk having a stop rotatable therewith and adjustable thereon angularly of the axis thereof, a part extending across the path of said stop and adapted when engaged thereby to separate said members and stop the conveyer, and a spring normally urging said disk toward a certain initial position.

11. The combination of a frame, a scale beam mounted in said frame and having a pivoted scale-pan adapted to be tilted for discharging its contents, a spiral conveyer for delivering material to said scale-pan, a pair of separable coacting members for controlling the operation of said conveyer, an electro magnet adapted to shift one of said members with respect to the other, an electric circuit controlling said magnet, a pair of switches controlling said circuit and arranged in shunt relation with each other, one of said switches being operated by the scale beam and being arranged to close when said scale beam is balanced, the second switch being normally urged to a closed position, dumping mechanism for tilting said scale-pan, said dumping mechanism being normally inactive and said magnet being adapted to cause the operation of said dumping mechanism, and a cam operated by said dumping mechanism and adapted to hold said second switch open when said dumping mechanism is in a position of rest and to release said switch while said dumping mechanism is in operation, all arranged to cause said conveyer and dumping mechanism to operate alternately.

12. The combination of a frame, a scale beam mounted in said frame and having a pivoted scale-pan adapted to be tilted for discharging its contents, a spiral conveyer for delivering material to said scale-pan, a pair of separable co-acting members for controlling the operation of said conveyer, an electro magnet adapted to shift one of said members with respect to the other, an electric circuit controlling said magnet, a pair of switches controlling said circuit and arranged in shunt relation with each other, one of said switches being operated by the scale beam and being arranged to close when said scale beam is balanced, the second switch being normally urged to a closed position, dumping mechanism for tilting said scale-pan, said dumping mechanism being normally inactive and said magnet being adapted to cause the operation thereof, and means operated by said dumping mechanism and adapted to hold said second switch open when said dumping mechanism is at rest and to release said switch while said dumping mechanism is in operation, all arranged to cause said conveyer and dumping mechanism to operate alternately.

13. The combination of a scale having pivotally mounted thereon a scale pan adapted to be tilted for discharging its contents, dumping mechanism adapted to tilt the scale pan and return the same to an upright position, yielding means normally preventing the operating of said dumping mechanism, and electro-magnetic means controlled by the scale and adapted to overcome said yielding means and cause the operation of said dumping mechanism when the scale is balanced.

14. The combination of a scale having a scale-pan pivotally mounted thereon, feeding mechanism for supplying material to said scale-pan, dumping mechanism adapted to cause said pan to oscillate on its pivot for discharging its contents and returning it to an upright position, mechanism for driving said feeding and dumping mechanisms, and electrical means controlled by the scale for causing said feeding and dumping mechanisms to operate alternately and automatically for measuring and discharging uniform quantities of material.

Signed at Chicago this 12th day of February 1906.

R. Y. BRADSHAW.

Witnesses:
 E. A. RUMMLER,
 L. A. SMITH.